United States Patent
Yong et al.

(10) Patent No.: US 8,891,523 B2
(45) Date of Patent: Nov. 18, 2014

(54) MULTI-PROCESSOR APPARATUS USING DEDICATED BUFFERS FOR MULTICAST COMMUNICATIONS

(75) Inventors: Hwan-jin Yong, Seoul (KR); Hyoung-jin Yun, Suwon-si (KR); Woon-hyug Jee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 155 days.

(21) Appl. No.: 13/486,563

(22) Filed: Jun. 1, 2012

(65) Prior Publication Data

US 2012/0307827 A1 Dec. 6, 2012

(30) Foreign Application Priority Data

Jun. 3, 2011 (KR) ........................ 10-2011-0054142

(51) Int. Cl.
*H04L 12/28* (2006.01)
*G06F 9/54* (2006.01)

(52) U.S. Cl.
CPC ............... *H01L 12/18* (2013.01); *G06F 9/544* (2013.01)
USPC ..................................... 370/390; 370/395.71

(58) Field of Classification Search
CPC .................................................... G05B 19/414
USPC ............................................. 370/390, 395.71
See application file for complete search history.

(56) References Cited

U.S. PATENT DOCUMENTS

2011/0010481 A1* 1/2011 Hamadani et al. ............ 710/313
2013/0107872 A1* 5/2013 Lovett et al. .................. 370/352

FOREIGN PATENT DOCUMENTS

| JP | 2008-015617 | 1/2008 |
|---|---|---|
| KR | 1988-0008187 | 8/1988 |
| KR | 1989-0001315 | 3/1989 |
| KR | 1020000013078 | 3/2000 |

* cited by examiner

*Primary Examiner* — Sai-Ming Chan
(74) *Attorney, Agent, or Firm* — Myers Bigel Sibley & Sajovec, P.A.

(57) ABSTRACT

An apparatus includes a multiprocessor including a plurality of processors including respective memories. Each of the memories has a dedicated storage location for multicast messages. At least one bus is coupled in common to the plurality of processors. The apparatus further includes an IPC unit coupled to the at least one bus and configured to retrieve multicast messages from the dedicated storage locations via the at least one bus and to selectively route the retrieved multicast messages among the plurality of memories.

20 Claims, 12 Drawing Sheets

MULTI-PROCESSOR APPARATUS USING DEDICATED BUFFERS FOR MULTICAST COMMUNICATIONS

CROSS-REFERENCE TO RELATED APPLICATIONS

This application claims the benefit of Korean Patent Application No. 10-2011-0054142, filed on Jun. 3, 2011, in the Korean Intellectual Property Office, the disclosure of which is incorporated herein in its entirety by reference.

BACKGROUND

The inventive subject matter relates to processor apparatus and methods, and more particularly, to multiprocessor apparatus and methods.

Various devices, such as personal computers (PCs), server computers, digital cameras, camcorders, mobile phones, and storage devices may include multiple processors. Microcontrollers (MCUs) may also utilize multiple processors.

Typically, in an electronic apparatus that includes multiple processors, messages are exchanged between the processors, i.e., inter-processor communication (IPC) may be required. Therefore, it is generally desirable to provide efficient communication between processors in multi-processor devices.

SUMMARY

In some embodiments of the inventive subject matter, an apparatus includes a multiprocessor including a plurality of processors. Each of the processors includes a core and an associated memory having a common buffer unit and a transmitting buffer unit defined therein. The apparatus further includes an inter-processor communication (IPC) unit coupled to the multiprocessor and configured to support communication between the processors. Each of the cores is configured to store multicast messages to be transmitted in the common buffer unit of the associated memory and to store unicast messages to be transmitted in the transmitting buffer unit of the associated memory.

In some embodiments, the IPC unit may include a direct memory access (DMA) control unit including a DMA buffer unit and configured to read the multicast message stored in a common buffer unit of first one of the processors and to store the multicast message in the DMA buffer unit. The DMA control unit may be further configured to send the multicast message stored in the DMA buffer unit to at least second and third ones of the processors. In further embodiments, each of the memories of the at least second and third ones of the processors may have a receiving buffer unit defined therein and the DMA control unit may be configured to write the multicast message in the receiving buffer units of the at least second and third ones of the processors. The DMA control unit may be configured to send the multicast message to at least one of the second and third ones of the processors and to transmit an acknowledgment signal for the at least one of the second and third ones of the processors to the first one of the processors.

In some embodiments, the multicast message may include a headed field identifying a receiving processor set. The header field may indicate the receiving processor set using a bitmap. The core of the first processor may be configured to modify the header field of the multicast message stored in the common buffer unit of the sending processor responsive to the acknowledgment signal.

In some embodiments, the DMA control unit may be configured to read a unicast message stored in the transmitting buffer unit and to store the unicast message in the DMA buffer unit and the DMA control unit may be further configured to send the unicast message stored in the DMA buffer unit to a second one of the processors. The DMA control unit may be configured to the multicast message prior to sending the unicast message.

In further embodiments of the inventive subject matter, an apparatus includes a multiprocessor including at least three processors, each of the processors including a core and an associated memory having a common buffer unit, a transmitting buffer unit and a receiving buffer unit defined therein. The apparatus further includes an IPC unit coupled to the multiprocessor and configured to support communication between the processors. Each of the at least three processors is configured to store multicast messages to be transmitted in the common buffer unit of the associated memory and to store unicast messages to be transmitted in the transmitting buffer unit of the associated memory.

In some embodiments, the IPC unit may be configured to read a multicast message stored in the common buffer unit of a first one of the at least three processors and to write the read multicast message in a receiving buffer unit of each of at least second and third ones of the at least three processors. The IPC unit may be configured to read a unicast message stored in the transmitting buffer unit of the first one of the at least three processors and to write the read unicast message in one other processor among the at least three processors. In some embodiments, the IPC unit may be configured to process first the multicast message prior to the unicast message. In some embodiments, the IPC unit may be configured to access the memories of the at least three processors independently from the cores of the at least three processors.

In still further embodiments of the inventive subject matter, an apparatus includes a multiprocessor including a plurality of processors including respective memories, each of the memories having a dedicated storage location for multicast messages. At least one bus is coupled in common to the plurality of processors. The apparatus further includes an IPC unit coupled to the at least one bus and configured to retrieve multicast messages from the dedicated storage locations via the at least one bus and to selectively route the retrieved multicast messages among the plurality of memories.

In some embodiments, the processors may be configured to modify header fields of messages stored in the dedicated storage locations for multicast messages responsive to acknowledgement messages received from the IPC unit. In further embodiments, each of the memories may also include respective dedicated storage locations for unicast messages intended for respective processors of the plurality of processors.

In some embodiments, the multiprocessor, the at least one bus and the IPC unit may be configured to enable direct memory access by the IPC unit to the plurality of memories independently of cores of the processors. The plurality of memories may each include dedicated storage locations for messages received from the IPC unit.

BRIEF DESCRIPTION OF THE DRAWINGS

Exemplary embodiments of the inventive subject matter will be more clearly understood from the following detailed description taken in conjunction with the accompanying drawings in which.

DETAILED DESCRIPTION

Figure 1:
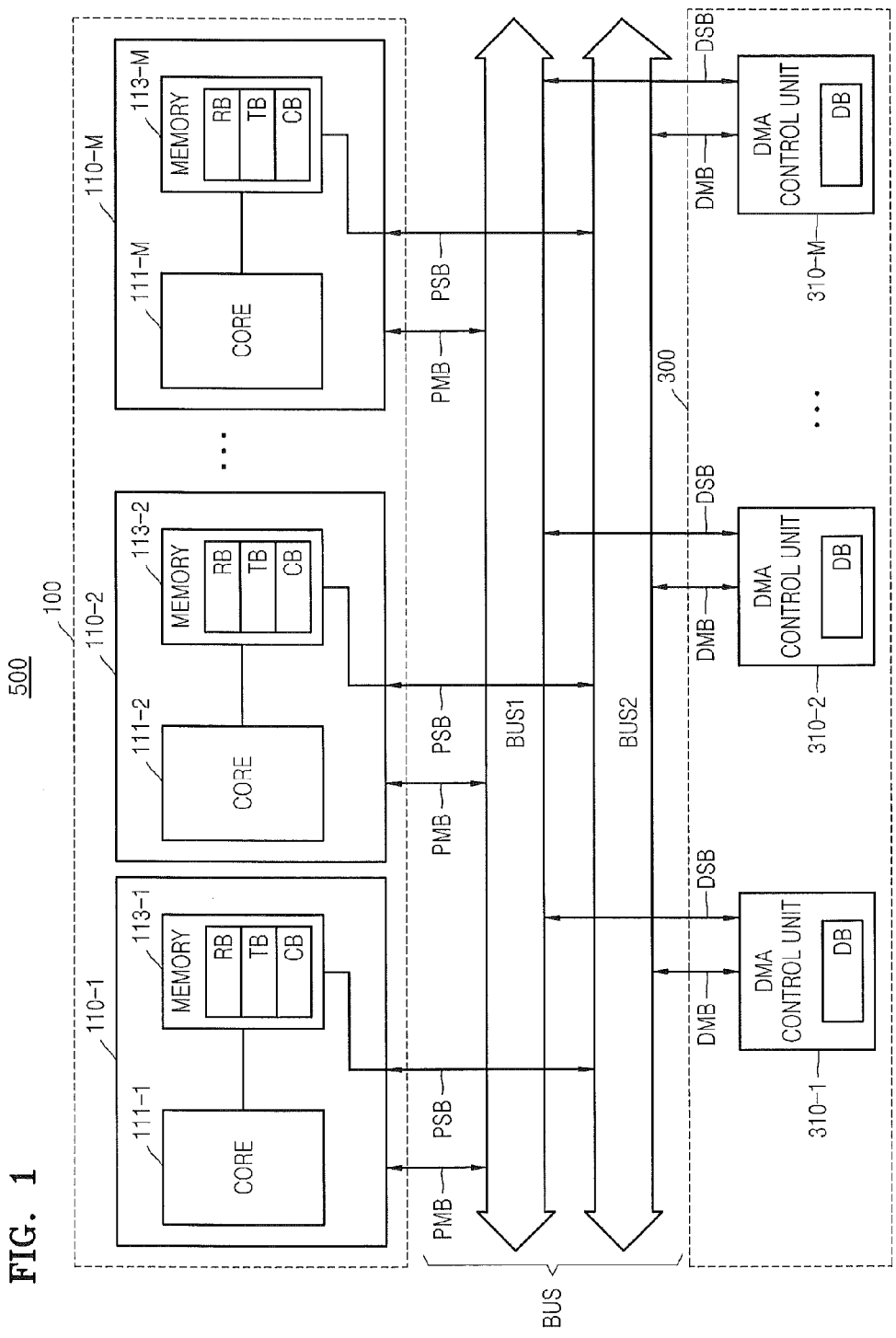
FIG. 1 is a block diagram illustrating an apparatus according to some embodiments of the inventive subject matter.

The attached drawings for illustrating preferred embodiments of the inventive subject matter are referred to in order to gain a sufficient understanding of the inventive subject matter, the merits thereof, and the objectives accomplished by the implementation of the inventive subject matter.

Hereinafter, the inventive subject matter will be described in detail by explaining preferred embodiments of the inventive subject matter with reference to the attached drawings. Like reference numerals in the drawings denote like elements.

FIG. 1 is a block diagram illustrating an electronic apparatus 500 according to some embodiments of the inventive subject matter. The apparatus 500 includes a multi-processor 100 and an inter-processor communication (IPC) unit 300 that are connected to each other through a bus BUS.

The multi-processor 100 includes a plurality of processors 110-1 to 110-M (where M is a natural number more than one). Each of the processors 110-1 to 110-M is a unit that independently reads and executes instructions for the electronic apparatus 500. For example, each of the processors 110-1 to 110-M may be a central processing unit (CPU) of a computing system or a control processor of a storage apparatus.

Each of the processors 110-1 to 110-M includes a plurality of cores 111-1 to 111-M and memories 113-1 to 113-M. Each of the cores 111-1 to 111-M reads and executes instructions. The memories 113-1 to 113-M may be referred to as tightly coupled memory (TCM).

The processors 110-1 to 110-M may operate independently, but message exchange between the processors 110-1 to 110-M may be required. The processors 110-1 to 110-M may perform IPC through the memories 113-1 to 113-M and the IPC unit 300. That is, the processors 110-1 to 110-M may send or receive a message through the memories 113-1 to 113-M and the IPC unit 300.

For purposes of the following description, a processor that sends a message to another processor is referred to as a "sending processor," and a processor that receives a message from the sending processor is referred to a "receiving processor." However, the number of receiving processors for one sending processor may be one or more. A message is referred to as "unicast message" when the number of receiving processors is one, and a message is referred to as a "multicast message" when the number of receiving processors is two or more, that is, a multicast message is a message that is sent from one sending processor to a plurality of receiving processors.

A plurality of receiving processors that receive the multicast message is referred to as "receiving processor set." A receiving processor set includes two or more processors other than a sending processor, among the processors 110-1 to 110-M included in the multi-processor 100. Particularly, when the receiving processor set includes all the processors 110-1 to 110-M other than a sending processor, this type of multicast message is referred to as a "broadcast message."

Types of multicast messages include a sudden power off (SPO) message for stopping an operation of each of the processors 110-1 to 110-M, a flush/dump message for writing all data of a cache memory (not shown) in a storage apparatus (not shown), an open message for starting the operation of each of the processors 110-1 to 110-M, and a reset message for resetting the operation of each of the processors 110-1 to 110-M.

Multicast messages may be categorized as urgent messages and non-urgent messages. For example, an SPO message and a flush/dump message may be urgent messages, and an open message and a reset message may be non-urgent messages.

Each of the memories 113-1 to 110-M includes a receiving buffer unit RB, a transmitting buffer unit TB, and a common buffer unit CB. A receiving buffer unit RB of a receiving processor is used to receive messages. A transmitting buffer unit TB and common buffer unit CB of a sending processor are used to send messages. Particularly, the common buffer unit CB is used to send multicast messages, and the transmitting buffer unit TB is used to send unicast messages.

The IPC unit 300 may include a plurality of direct memory access (DMA) control units 310-1 to 310-M, each of which may include a DMA buffer unit DB. The DMA control units 310-1 to 310-M may respectively correspond to the processors 110-1 to 110-M. For example, an nth DMA control unit 310-$n$ (where n=1, 2, . . . , M) corresponds to an nth processor 110-$n$. When the nth processor 110-$n$ is a sending processor, a message is delivered to a receiving processor through the nth DMA control unit 310-$n$.

Each of the DMA control units 310-1 to 310-M may access the memories 113-1 to 113-M, read a message stored in each of the memories 113-1 to 113-M, and write a message in the memories 113-1 to 113-M. Each of the DMA control units 310-1 to 310-M may perform an operation that read a message stored in the nth memory 113-$n$ (where n=1, 2, . . . , M) or write a message in the nth memory 113-$n$, without the intervention of the nth core 111-$n$.

In FIG. 1, the IPC unit 300 is illustrated as including the DMA control units 310-1 to 310-M, each of which includes a DMA buffer unit DB. However, in some embodiments, the IPC unit 300 may be implemented with one integrated DMA control unit including one integrated DMA buffer unit.

Figure 2:
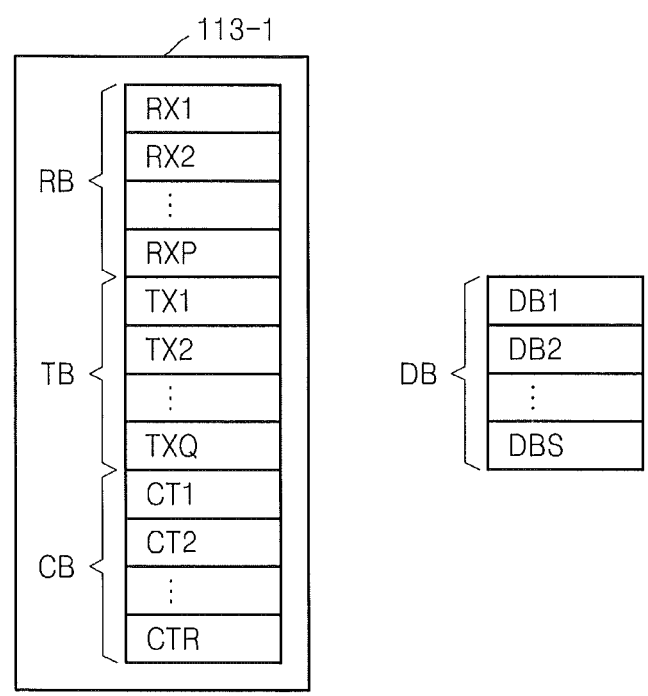
FIG. 2 is a diagram illustrating an example of a DMA buffer unit and a memory for the apparatus of FIG. 1.

FIG. 2 is a diagram illustrating examples of a DMA buffer unit DB and a memory for the electronic apparatus 500 of FIG. 1. For convenience, only one memory and DMA buffer unit will be described below. However, the structures and operations described with reference to FIG. 2 may be applied to each of the memories and DMA buffer units of FIG. 1.

Referring to FIG. 2, a first memory 113-1 includes a receiving buffer unit RB including one or more receiving buffers RX1 to RXP, a transmitting buffer unit TB including one or more transmitting buffers TX1 to TXQ, and a common buffer unit CB including one or more common buffers CT1 to CTR. A DMA buffer unit DB includes one or more DMA buffers DB1 to DBS.

The number of receiving buffers RX1 to RXP, the number of transmitting buffers TX1 to TXQ, the number of common buffers CT1 to CTR, and the number of DMA buffers DB1 to DBS may depend on the number of processors 110-1 to 110-M included in the electronic apparatus 500 (see FIG. 1).

Referring again to FIG. 1, buses BUS connecting the multiprocessor 100 and the IPC unit 300 may include a first bus BUS1 and a second bus BUS2. Moreover, the buses BUS may include a plurality of master buses and a plurality of slave buses. The master buses include a plurality of processor master buses PMB a plurality of DMA Controller (DMAC) master buses DMB. The slave buses include a plurality of processor slave buses PSB and a plurality of DMA Control unit (DMAC) slave buses DSB.

Respective ones of the processor master buses PMB connect the processors 110-1 to 110-M to the first bus BUS1. Respective ones of the processor slave buses PSB connect the processors 110-1 to 110-M to the second bus BUS2. Respective ones of the DMAC master buses DMB connect the DMA control units 310-1 to 310-M to the second bus BUS2. Respective ones of the DMAC slave buses DSB connect the DMA control units 310-1 to 310-M to the first bus BUS1.

Respective ones of the processor slave buses PSB are connected to the memories 113-1 to 113-M. Respective ones of the memories 113-1 to 113-M may be connected to the processor master buses PMB. Moreover, respective ones of the cores 111-1 to 111-M may be connected to the processor master buses PMB and to the processor slave buses PSB.

The processor master bus PMB may be used when an apparatus connected to the processor master bus PMB operates independently, and the DMAC master bus DMB may be used when an apparatus connected to the DMAC master bus DMB operates independently. The processor slave bus PSB may be used when an apparatus other than an apparatus connected to the processor slave bus PSB operates independently, and the DMAC slave bus DSB may be used when an apparatus other than an apparatus connected to the DMAC slave bus DSB operates independently. For example, when the first processor 110-1 transmits information to an output unit, the first processor 110-1 may transmit data through the processor master bus PBM because the first processor 110-1 operates independently. When the first DMA control unit 310-1 reads/writes a message from/in the first memory 113-1 of the first processor 110-1, an operation of reading/writing a message may be performed through the processor slave bus PSB because the first DMA control unit 310-1 operates independently. Therefore, transmitting information to an output unit and reading/writing a message that is controlled by the first DMA control unit 310-1 may be simultaneously performed in the first processor 110-1.

Hereinafter, operations for communicating messages between the processors 110-1 to 110-M will be described.

Figure 3:
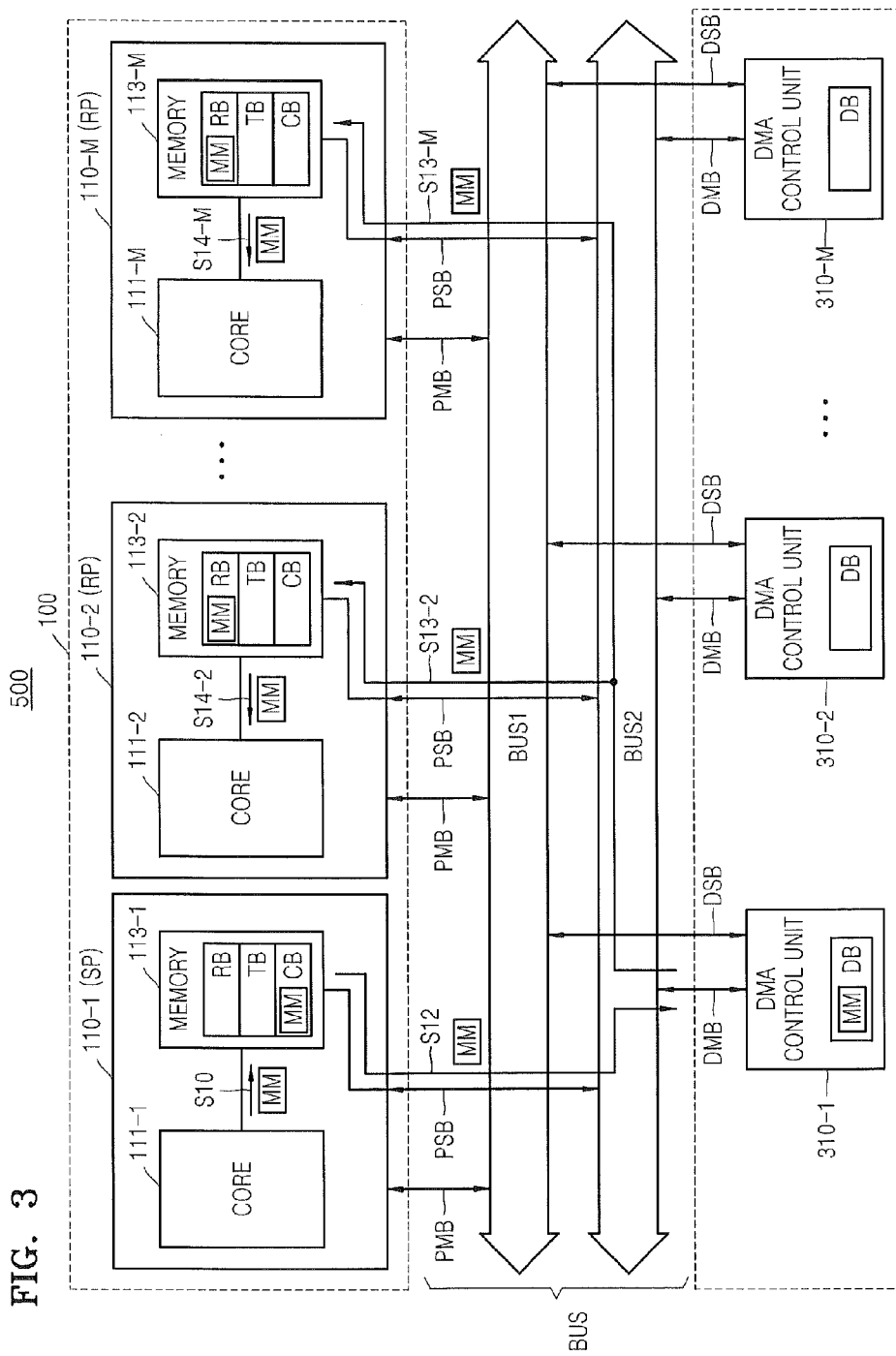
FIG. 3 is a diagram illustrating operations for sending a multicast message in the apparatus of FIG. 1.

FIG. 3 is a diagram illustrating operations for sending a multicast message in the electronic apparatus 500 of FIG. 1. In the example operations described with reference to FIG. 3, the first processor 110-1 of the processors 110-1 to 110-M is a sending processor SP. However, FIG. 3 illustrates an example for convenience, and descriptions below may be applied even to a case where each of the other processors 110-2 to 110-M is a sending processor SP.

Moreover, in FIG. 3, receiving processors RPs included in a receiving processor set includes the other processors 110-2 to 110-M other than the first processor 110-1. That is, FIG. 3 illustrates a case where a multicast message MM is a broadcast message. However, FIG. 3 illustrates an example for convenience, and descriptions below may be applied for other types of messages.

In operation S10, the first core 111-1 writes the multicast message MM in the common buffer unit CB of the first memory 113-1. In operation S12, the first DMA control unit 310-1 reads the multicast message MM stored in the common butter unit CB and stores the multicast message MM in the DMA buffer unit DB. The first DMA control unit 310-1 may read the multicast message MM stored in the common butter unit CB and copy the multicast message MM to the DMA buffer unit DB.

The first DMA control unit 310-1 may read the multicast message MM through the processor slave bus PSB and second bus BUS2 connected to the first processor 110-1 and the DMAC master bus DMB connected to the first DMA control unit 310-1.

The first DMA control unit 310-1 may determine whether the multicast message MM is stored in the common buffer unit CB of the first processor 110-1, before reading the multicast message MM stored in the common buffer unit CB.

The first DMA control unit 310-1 may perform polling to determine whether the multicast message MM is present. Polling denotes that the first DMA control unit 310-1 accesses the memory 113-1 and checks whether a message for sending is stored in the common buffer unit CB and the transmitting buffer unit TB. Polling may be periodically performed. The first DMA control unit 310-1 may check the common buffer unit CB prior to the transmitting buffer unit TB.

The first DMA control unit 310-1 may be informed that the multicast message MM is stored by an interrupt signal transmitted from the first processor 110-1 (the sending processor SP). The interrupt signal may be a signal indicating that there is a message to be sent from the first processor 110-1 to the first DMA control unit 310-1. The interrupt signal may be transmitted from the cores 111-1 to 111-M of the sending processor SP. For example, when the multicast message MM is stored in the common buffer unit CB of the first memory 113-1, the first processor 110-1 may deliver the interrupt signal to the first DMA control unit 310-1.

In operations S13: S13-2 to S13-M, the first DMA control unit 310-1 sends the multicast message MM, stored in the DMA buffer unit DB, to the receiving processors 110-2 to 110-M included in the receiving processor set. The first DMA control unit 310-1 sending the multicast message MM may denote an operation where the first DMA control unit 310-1 writes the multicast message MM in the receiving buffer unit RB of each of the memories 113-2 to 113-M in the respective receiving processors 110-2 to 110-M included in the receiving processor set.

The multicast message MM may be sent to the memories 113-2 to 113-M through the DMAC master bus DMB, second bus BUS2, and processor slave bus PSB. The first DMA control unit 310-1 may sequentially send the multicast message MM to the memories 113-1 to 113-M. Alternatively, the first DMA control unit 310-1 may simultaneously send the multicast message MM to the memories 113-1 to 113-M.

In operations S14: S14-2 to S14-M, the respective cores 111-2 to 111-M of the receiving processors 110-2 to 110-M included in the receiving processor set read multicast messages MM stored in the respective memories 113-2 to 113-M. The respective cores 111-2 to 111-M of the receiving processors 110-2 to 110-M may perform an operation indicated by the multicast message MM.

Using the above-described operations, the sending processor SP may send the multicast message MM to the receiving processors RPs included in the receiving processor set, by using the common buffer unit CB and the IPC unit 300.

Figure 4:
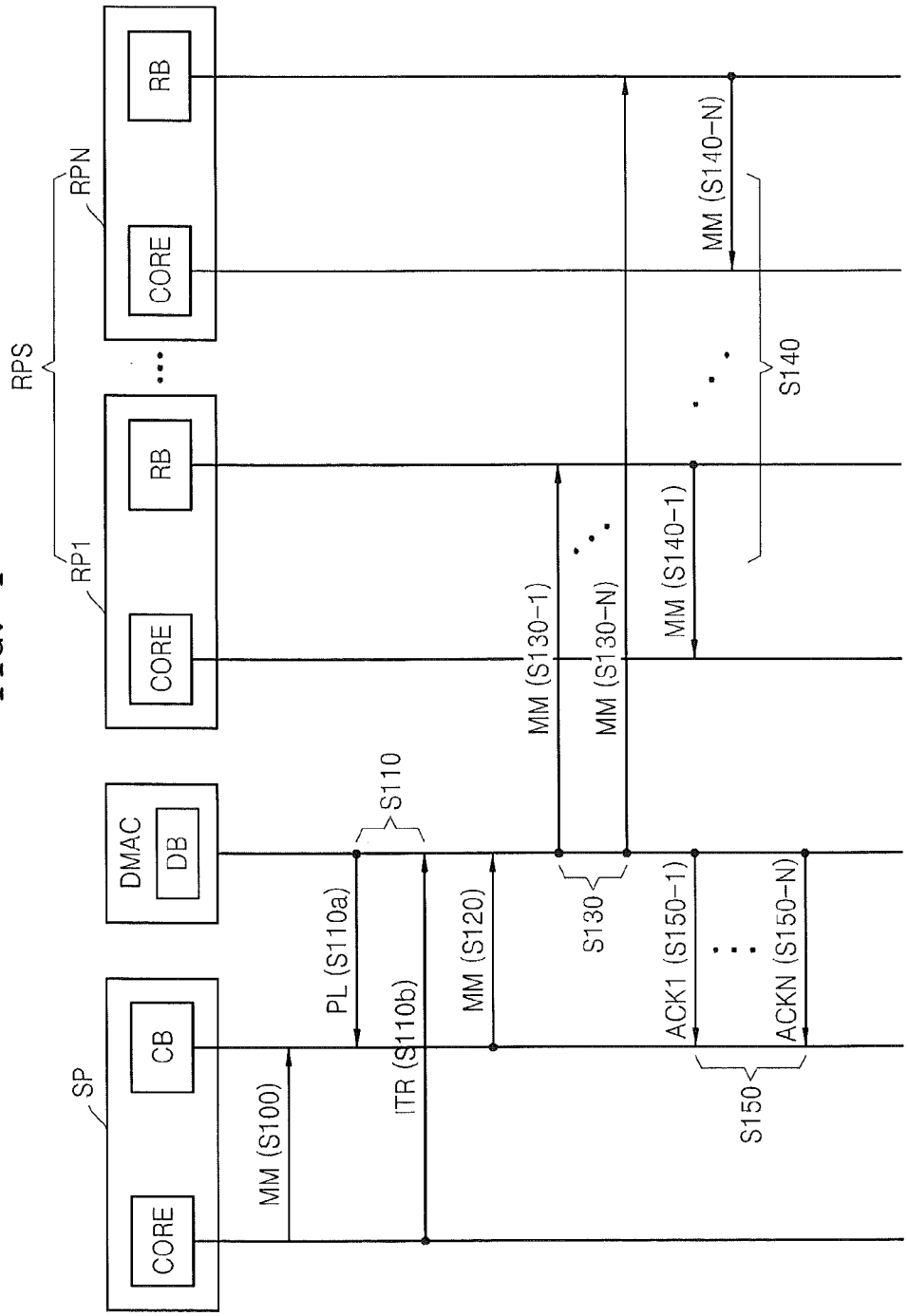
FIG. 4 is a flowchart illustrating operations for sending a multicast message an apparatus according to some embodiments of the inventive subject matter.

FIG. 4 illustrates operations for sending a multicast message according to some embodiments of the inventive subject matter. The operations of FIG. 4 may be performed by the electronic apparatus 100 of FIG. 1.

Referring to FIG. 4, in an operation S100, a core of a sending processor SP writes a multicast message MM in a common buffer unit CB.

In an operation S120, a DMA control unit DMAC reads the multicast message MM stored in the common buffer unit CB of a memory and stores the multicast message MM in a DMA buffer unit DB.

In an operation S110, the DMA control unit DMAC may determine whether the multicast message MM is stored in the common buffer unit CB of the sending processor SP, before reading the multicast message MM stored in the common buffer unit CB. In an operation S110a, the DMA control DMAC may perform polling (PL) to determine whether the multicast message MM is stored in the common buffer unit CB of the sending processor SP. In an operation S110b, alternatively, the DMA control unit DMAC may determine whether the multicast message MM is stored in the common buffer unit CB of the sending processor SP, with an interrupt signal ITR transmitted from the sending processor SP.

In operations S130: S130-1 to S130-N, the DMA control unit DMAC writes the multicast message MM, stored in the DMA buffer unit DB, in a receiving buffer unit RB of each of a plurality of receiving processors RP1 to RPN included in a receiving processor set RPS. The DMA control unit DMAC may sequentially or simultaneously write the multicast message MM in the respective receiving buffer units RB of the receiving processors RP1 to RPN.

In operations S140: S140-1 to S140-N, each of the receiving processors RP1 to RPN included in the receiving processor set RPS reads the multicast message MM stored in a corresponding receiving buffer unit RB.

In operations S150: S150-1 to S150-N, the multicast message MM is written in each receiving buffer unit RB, and then, the DMA control unit DMAC may transmit a plurality of ACK signals ACK1 to ACKN for the multicast message MM, to the sending processor SP. The ACK signals ACK1 to ACKN may be transmitted to the common buffer unit CB of the sending processor SP. The nth ACK signal ACKn (where n=1, 2, . . . , N) may be a signal indicating that the multicast message MM has been written in the receiving buffer unit RB of the nth receiving processor RPn. The ACK signals ACK1 to ACKN may be transmitted sequentially or simultaneously. Alternatively, the ACK signals ACK1 to ACKN may be transmitted as one integrated ACK signal.

Using the above operations, the sending processor SP may send the multicast message MM to the receiving processors RP1 to RPN included in the receiving processor set RPS, by using the common buffer unit CB and the DMA control unit DMAC.

Figure 5:
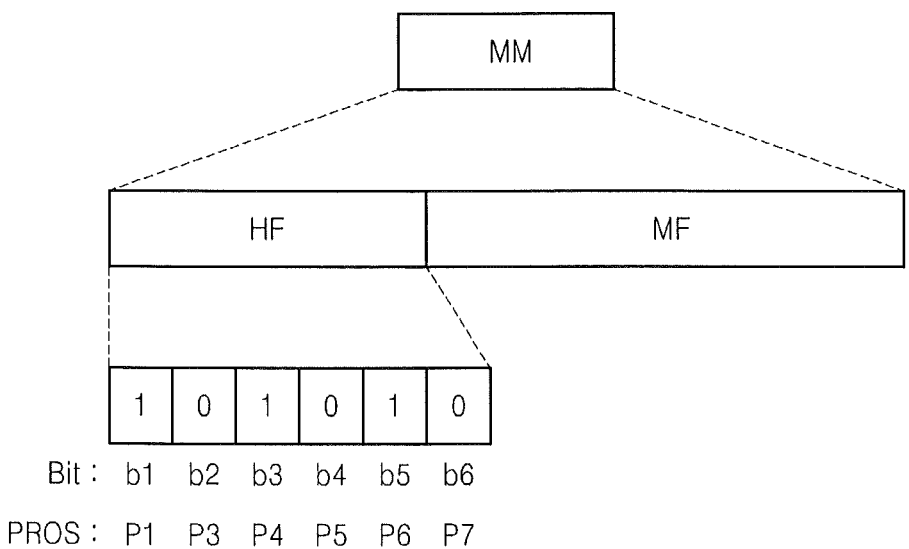
FIG. 5 is a diagram illustrating an example of a multicast message communicated in an apparatus according to some embodiments of the inventive subject matter.

FIG. 5 is a diagram illustrating an example of a multicast message MM that may be sent among a plurality of processors in an electronic apparatus according to some embodiments of the inventive subject matter. Referring to FIG. 5, the multicast message MM includes a header field HF indicating a receiving processor set, and a message field MF indicating content of the multicast message MM. The header field HF may indicate the receiving processor set by using a bitmap. For convenience, it is assumed that the electronic apparatus includes seven processors PROS: first to seventh processors P1 to P7 and a sending processor is the second processor P2.

Respective bits b1 to b6 of the header field HF may correspond to the processors P1 and P3 to P7 other than the second processor P2 being the sending processor. The size of the header field HF may be 6 bits. In the header field HF, a bit corresponding to a receiving processor included in the receiving processor set may be indicated as 1. For example, the second bit b2 of the header field HF corresponds to the third processor P3, and when the second bit b2 is 0, the third processor P3 is not included in the receiving processor set. As illustrated in FIG. 5, when the header field HF is "0b101010", this may denote that the receiving processor set includes the first, fourth and sixth processors P1, P4 and P6.

Figure 6:
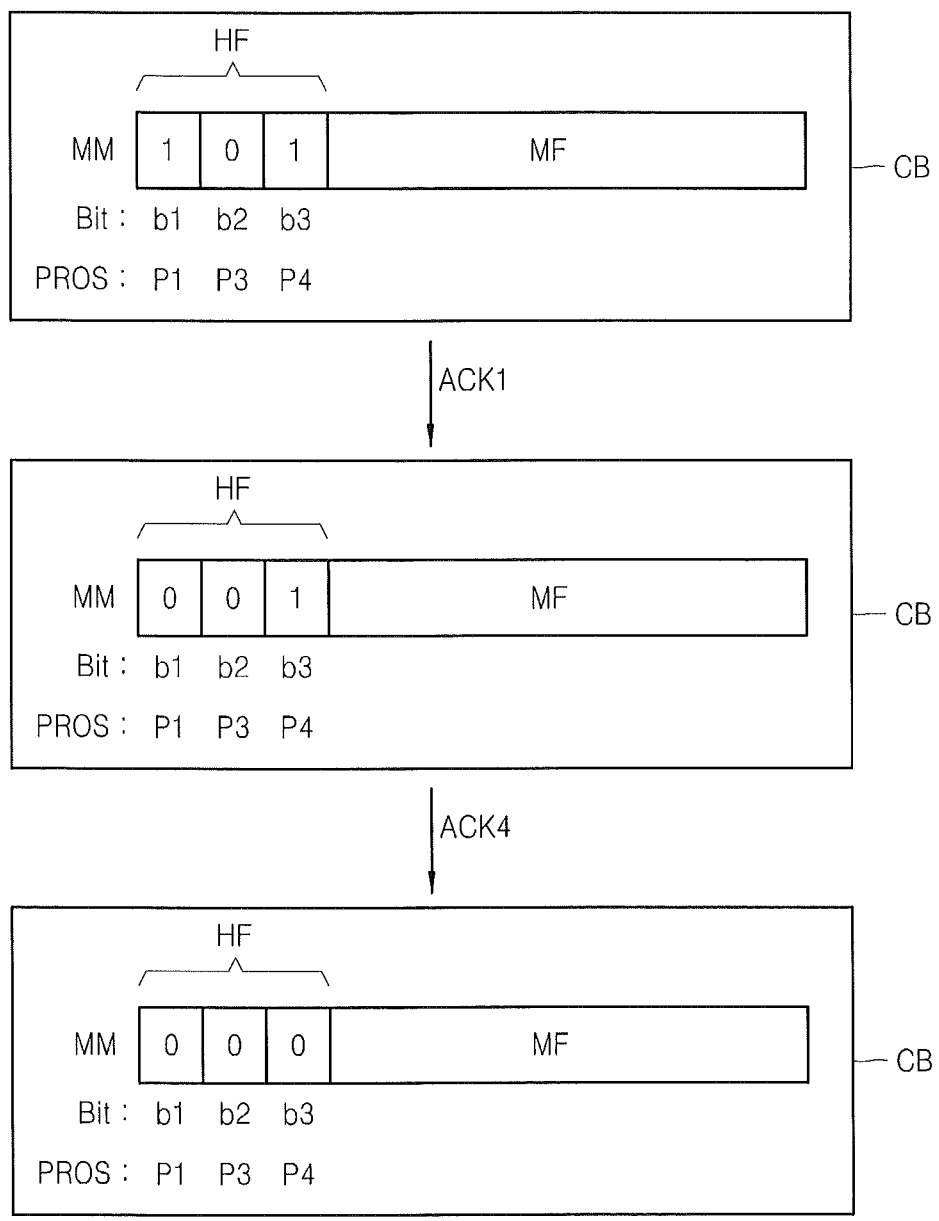
FIG. 6 is a diagram illustrating storage of a multicast message in a common buffer unit of an apparatus according to some embodiments of the inventive subject matter.

FIG. 6 is a diagram illustrating an example of a multicast message MM according to some embodiments of the inventive subject matter. In FIG. 6, it is assumed that an electronic apparatus includes four processors PROS: P1 to P4 and a sending processor is the second processor P2.

Referring to FIG. 6, the multicast message MM is stored in a common buffer unit CB of the second processor P2 being the sending processor. The size of a header field HF of the multicast message MM is 3 bits and the header field HF is indicated by a bitmap scheme that a receiving processor set includes the first and fourth processors P1 and P4.

A DMA control unit writes the multicast message MM in a memory of the first processor P1 being a receiving processor, and thereafter transmits a first ACK signal ACK1 to the second processor P2 being a sending processor. The second processor P2 may know that the multicast message MM has been sent to the first processor P1, with the first ACK signal ACK1. The second processor P2 may change the bit b1 of the header field HF, indicating the first processor P1, from 1 to 0 according to the first ACK signal ACK1. The first ACK signal ACK1 may denote an operation of the DMA control unit that changes the bit b1 of the header field HF, indicating the first processor P1, from 1 to 0.

The DMA control unit writes the multicast message MM in a memory of the fourth processor P4 being a receiving processor, and thereafter transmits the fourth ACK signal ACK4 to the second processor P2 being a sending processor. The bit b3 of the header field HF indicating the fourth processor P4 may be changed from 1 to 0 according to the fourth ACK signal ACK4.

The second processor P2 being the sending processor may recognize whether the sending of the multicast message MM to any receiving processor of the receiving processor set is completed, based on the header field HF of the multicast message MM stored in the common buffer unit CB.

When the multicast message MM is sent to all the receiving processors of the receiving processor set, the second processor P2 being the sending processor may delete the multicast message MM stored in the common buffer unit CB, or rewrite another multicast message MM in the common buffer unit CB.

Figure 7:
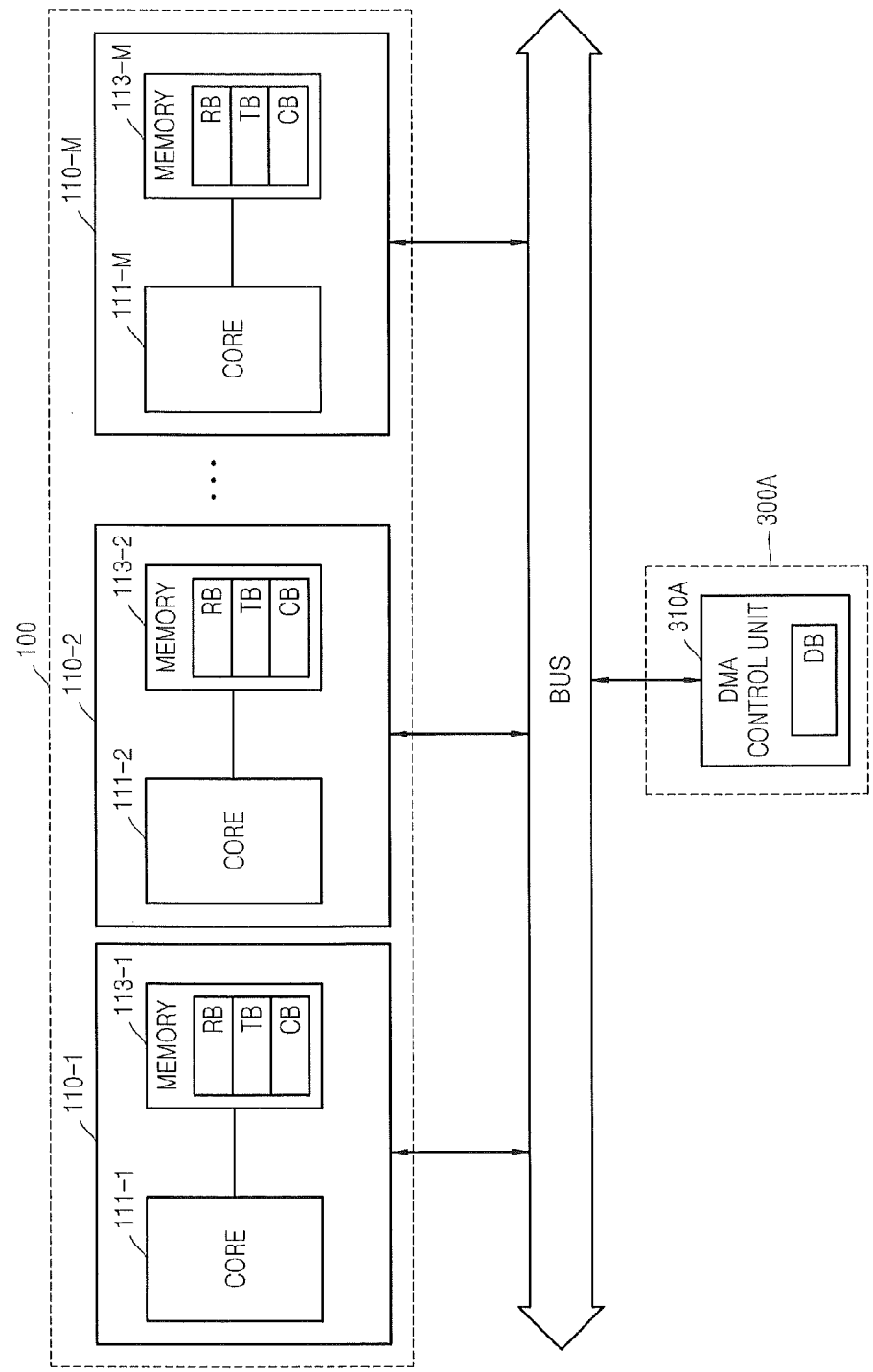
FIG. 7 is a block diagram illustrating an apparatus according to further embodiments of the inventive subject matter.

FIG. 7 is a block diagram illustrating an electronic apparatus 500A according to some embodiments of the inventive subject matter. The electronic apparatus 500A of FIG. 7 and the electronic apparatus 500 of FIG. 1 include like components referred to by like reference numerals. Referring to FIG. 7, the electronic apparatus 500A includes a multi-processor 100 and an inter-processor communication (IPC) unit 300A that are connected to each other through a bus BUS. The IPC unit 300A includes one DMA control unit 310A including one DMA buffer unit DB.

The IPC unit 300 of FIG. 1 includes the DMA control units 310-1 to 310-M, each of which includes the DMA buffer unit DB. However, the IPC unit 300A of FIG. 7 includes one integrated DMA control unit 310A including one integrated DMA buffer unit DB.

Figure 8:
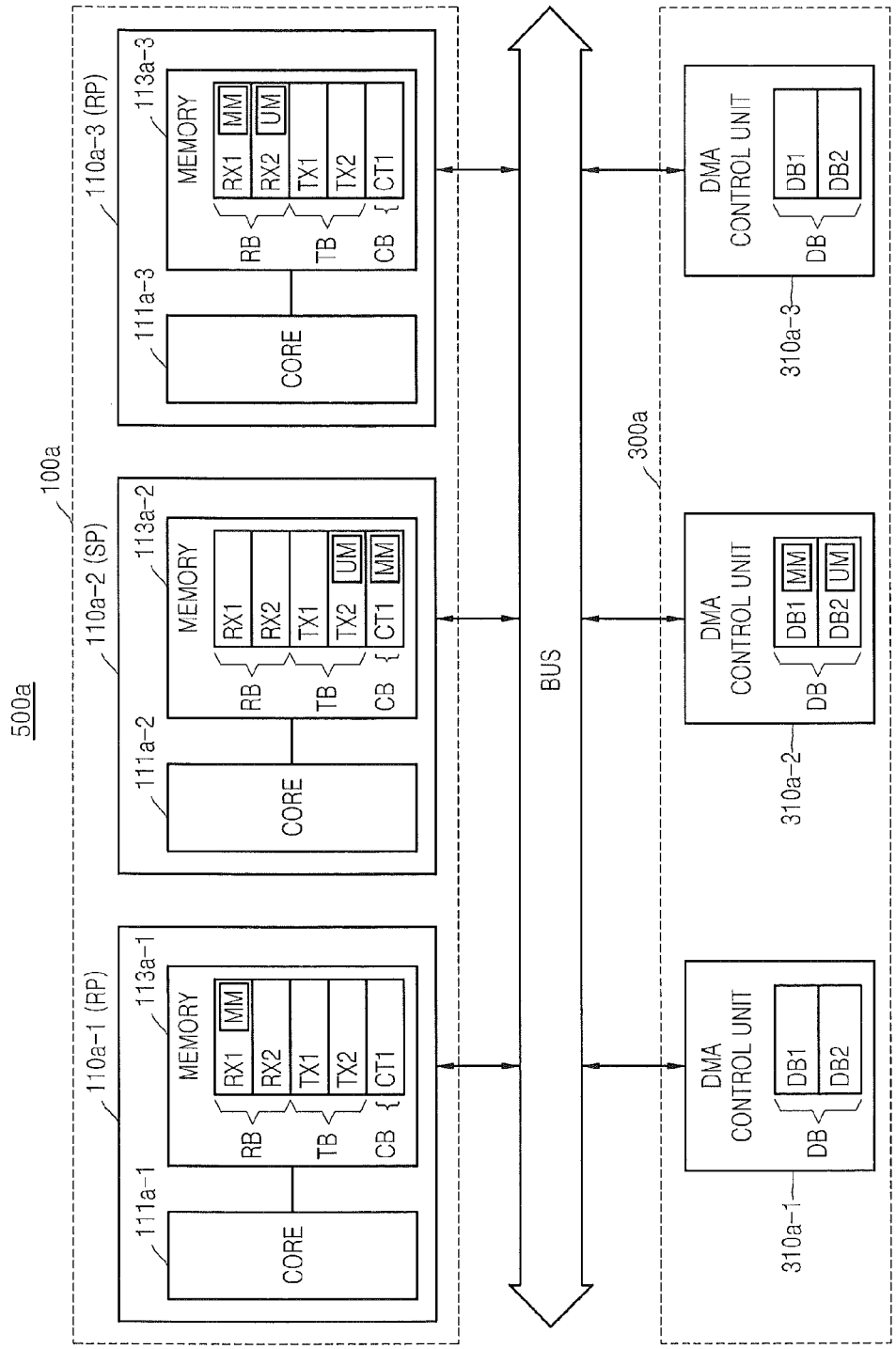
FIG. 8 is a diagram illustrating operations for sending a multicast message according to some embodiments of the inventive subject matter.

FIG. 8 is a block diagram illustrating an operation of sending a multicast message MM in the electronic apparatus 500a according to some embodiments of the inventive subject matter. The electronic apparatus 500a of FIG. 8 and the electronic apparatus 500 of FIG. 1 include like components identified by like reference numerals.

Referring to FIG. 8, the electronic apparatus 500a includes three processors 110a-1 to 110a-3, and an IPC unit 300a includes three DMA control units 310a-1 to 310a-3. In FIG. 8, it is assumed that a sending processor SP is a second processor 110a-2, which has a multicast message MM to be sent to first and third processors 110a-1 and 110a-3. A plurality of receiving processors RP included in a receiving processor set are the first and third processors 110a-1 and 110a-3. Also, it is assumed that the second processor 110a-2 has a unicast message UM to be sent to the third processor 110a-3.

A receiving buffer unit RB of each of a plurality of memories 113a-1 to 113a-3 may include two receiving buffers RX1 and RX2, a transmitting buffer unit TB of each of the memories 113a-1 to 113a-3 may include two transmitting buffers TX1 and TX2, and a common buffer unit CB of each of the memories 113a-1 to 113a-3 may include one common buffer CT1. Each DMA buffer unit DB includes two DMA buffers DB1 and DB2. The transmitting buffers TX1 and TX2 of the transmitting buffer unit TB may correspond to one of the processors 110a-1 to 110a-3 other than a processor of the transmitting buffer unit TB. For example, the first transmitting buffer TX1 of the second memory 113a-2 may correspond to the first processor 110a-1, and the second transmitting buffer TX2 of the second memory 113a-2 may correspond to the third processor 110a-3. The second processor 110a-2 being a sending processor SP may store a unicast message in a transmitting buffer, which corresponds to a receiving processor RP receiving the unicast message UM, when storing the unicast message UM.

In FIG. 8, the number of buffers included in each of the memories 113a-1 to 113a-3, the number of buffers included in each DMA buffer unit DB, and a scheme of storing the unicast message UM in the transmitting buffer unit TB are merely examples.

The second processor 110a-2 stores a multicast message MM to be sent to the first and third processors 110a-1 and 110a-3 in the first common buffer CT1 of the common buffer unit CB. Also, the second processor 110a-2 may store a unicast message UM to be sent to the third processor 110a-3 in the second transmitting buffer TX2 corresponding to the third processor 110a-3.

The second DMA control unit 310a-2 reads the multicast message MM stored in the common butter unit CB and stores the multicast message MM in the DMA buffer DB1 of the DMA buffer unit DB. Also, the second DMA control unit 310a-2 reads the unicast message UM stored in the transmitting butter unit TB and stores the unicast message UM in the DMA buffer DB2 of the DMA buffer unit DB.

The second DMA control unit 310a-2 may simultaneously read the multicast message MM and the unicast message UM, or read the multicast message MM and the unicast message UM at different times. Alternatively, the second DMA control unit 310a-2 may not read the unicast message UM until the sending of the multicast message MM is completed.

The second DMA control unit 310a-2 stores the multicast message MM, stored in the DMA buffer DB1, in the receiving buffer RX1 of each of the memories 113a-1 and 113a-3 of the respective receiving processors 110a-1 and 110a-3 included in the receiving processor set. Also, the second DMA control unit 310a-2 stores the unicast message UM, stored in the DMA buffer DB2, in the receiving buffer RX2 of the third memory 113a-3 of the third processor 110a-3.

In this case, the second DMA control unit 310a-2 may first process the multicast message MM prior to the unicast message UM. For example, when the multicast message MM is stored in the common buffer unit CB of the second processor 110a-2 being the sending processor SP and the unicast message UM is stored in the transmitting buffer unit TB of the sending processor SP, the second DMA control unit 310a-2 may not read the unicast message UM until before the sending of the multicast message MM is completed.

Otherwise, the second DMA control unit 310a-2 may read the multicast message MM and the unicast message UM, and store the multicast message MM and the unicast message UM in the DMA buffer unit DB of the second DMA control unit 310a-2. In this case, the second DMA control unit 310a-2 may first send the multicast message MM prior to the unicast message UM.

In this way, the second processor 110a-2 being the sending processor SP may send the multicast message MM and the unicast message UM to each receiving processor RP, by using the second DMA control unit 310a-2 of the IPC unit 300a and the second memory 113a-2. Particularly, the common buffer CB is used for the multicast message MM, and the transmitting buffer TB is used for the unicast message MM.

Figure 9:
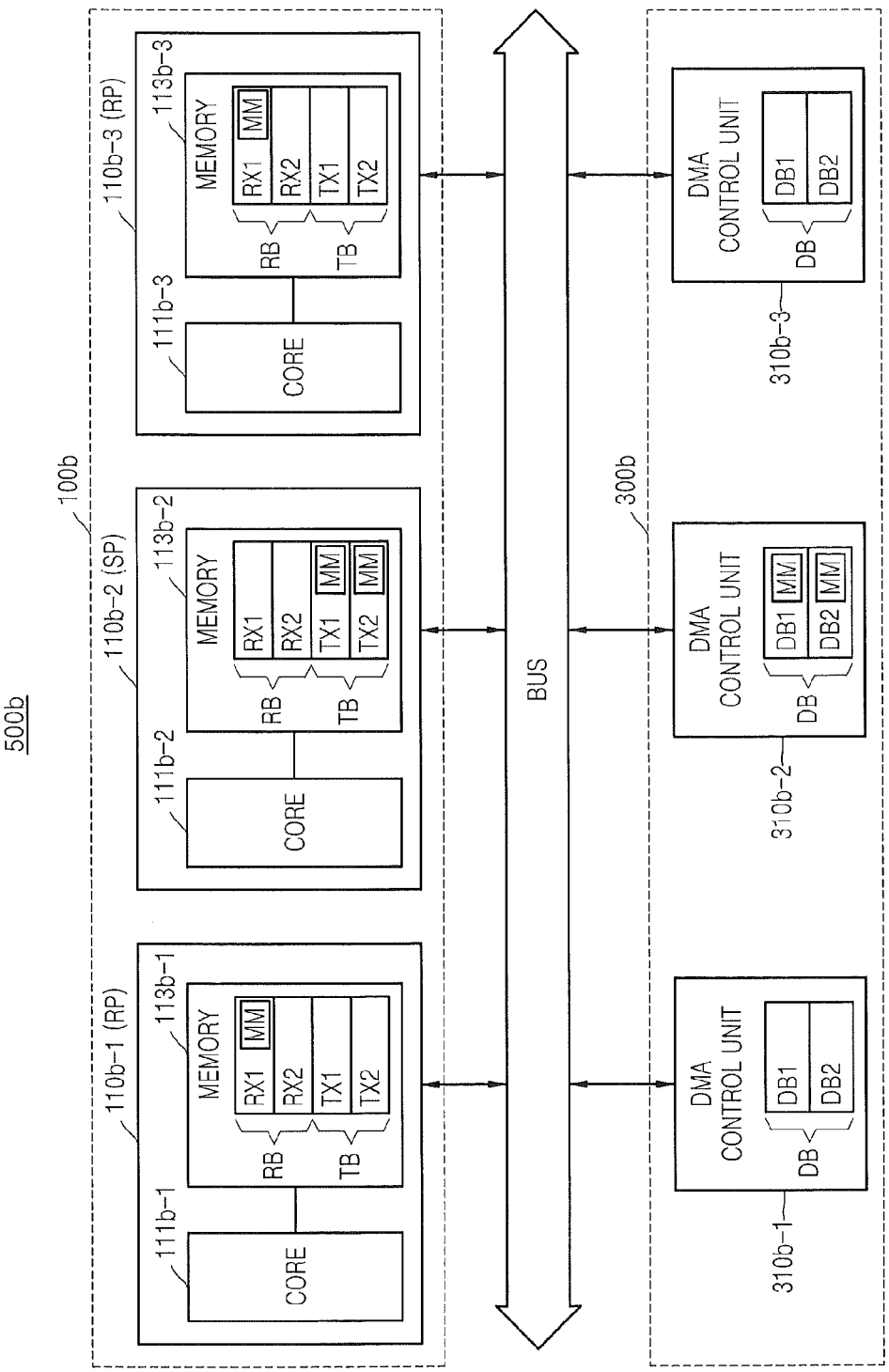
FIG. 9 is a diagram illustrating operations for sending a message in an apparatus which does not include a common buffer unit.

FIG. 9 is a diagram illustrating an operation of transmitting a message in an electronic apparatus 500b that does not include a common buffer unit. Referring to FIG. 9, the electronic apparatus 500b does not include the common buffer unit CB included in the electronic apparatus 500a of FIG. 8. In FIG. 9, it is assumed that a sending processor SP is a second processor 110b-2. In FIG. 9, it is assumed that the second processor 110b-2 has a multicast message MM to be sent to first and third processors 110b-1 and 110b-3. That is, a plurality of receiving processors RPs included in a receiving processor set are the first and third processors 110b-1 and 110b-3.

The second processor 110b-2 stores a multicast message MM to be sent to the first processor 110b-1 in a first transmitting buffer TX1 of a second memory 113b-2 corresponding to the first processor 110b-1, and stores a multicast message MM to be sent to the third processor 110b-3 in a second transmitting buffer TX2 corresponding to the third processor 110b-3.

The electronic apparatus 500b of FIG. 9 does not include a common buffer unit CB, and the multicast message is repeatedly stored in the transmitting buffers TX1 and TX2 of the transmitting buffer unit TB in proportion to the number of receiving processes included in a receiving processor set. A second DMA control unit 310b-2 reads the same multicast message MM, stored in the two transmitting buffers TX1 and TX2 twice and stores the multicast message MM in two DMA buffers DB1 and DB2 of a DMA buffer unit DB.

The second DMA control unit 310b-2 writes the multicast message MM, stored in the first DMA buffer DB1, in a receiving buffer RX1 of the first memory 113b-1. Also, the second DMA control unit 310b-2 writes the multicast message MM, stored in the second DMA buffer DB2, in a receiving buffer RX1 of the third memory 113b-3.

The electronic apparatus 500b of FIG. 9 does not include the common buffer unit CB, and the multicast message MM is processed like a unicast message, that is, when the sending processor SP intends to send a multicast message MM, the multicast message MM is repeatedly stored in the transmitting buffer unit TB in proportion to the number of receiving processes included in the receiving processor set. Therefore, the sending processor SP repeatedly writes the multicast message MM in the transmitting buffer unit TB.

In contrast, in the electronic apparatus 500a of FIG. 8, the multicast message MM is stored in the common buffer unit CB, and thus, the sending processor SP writes the multicast message MM in the common buffer unit CB only once. Since the same multicast message MM is not repeatedly written in the memory 113a-2, the memory 113a-2 of the sending processor SP can be efficiently used, and the overhead of the operation of the sending processor SP can be reduced.

In the electronic apparatus 500b of FIG. 9, the second DMA control unit 310b-2 repeatedly reads the same multicast message MM stored in the transmitting buffers TX1 and TX2, and writes the multicast message MM in the DMA buffers DB1 and DB2. In contrast, in the electronic apparatus 500a of FIG. 8, the second DMA control unit 310a-2 reads the multicast message MM, stored in the common buffer unit CB, once and writes the multicast message MM in the DMA buffers DB1 only once. Accordingly, the DMA buffer unit DB can be efficiently used, and the overhead of the operation of the second DMA control unit 310a-2 can be reduced. In addition, the traffic of a bus decreases due to the moving of a multicast message MM.

According to some embodiments of the inventive subject matter, as described above, an electronic apparatus that can efficiently perform communication between a plurality of processors is provided. Each memory of a plurality of processors may include a common buffer unit, and thus, a memory and a buffer can be efficiently used, and the overheads of the operations of a processor and DMA control unit can be reduced. Bus traffic may also decrease in comparison to conventional approaches. Moreover, by processing a multicast message stored in a common buffer prior to a unicast message stored in a transmitting buffer, the performance of an electronic apparatus can be enhanced when the multicast message is an urgent message.

Figure 10:
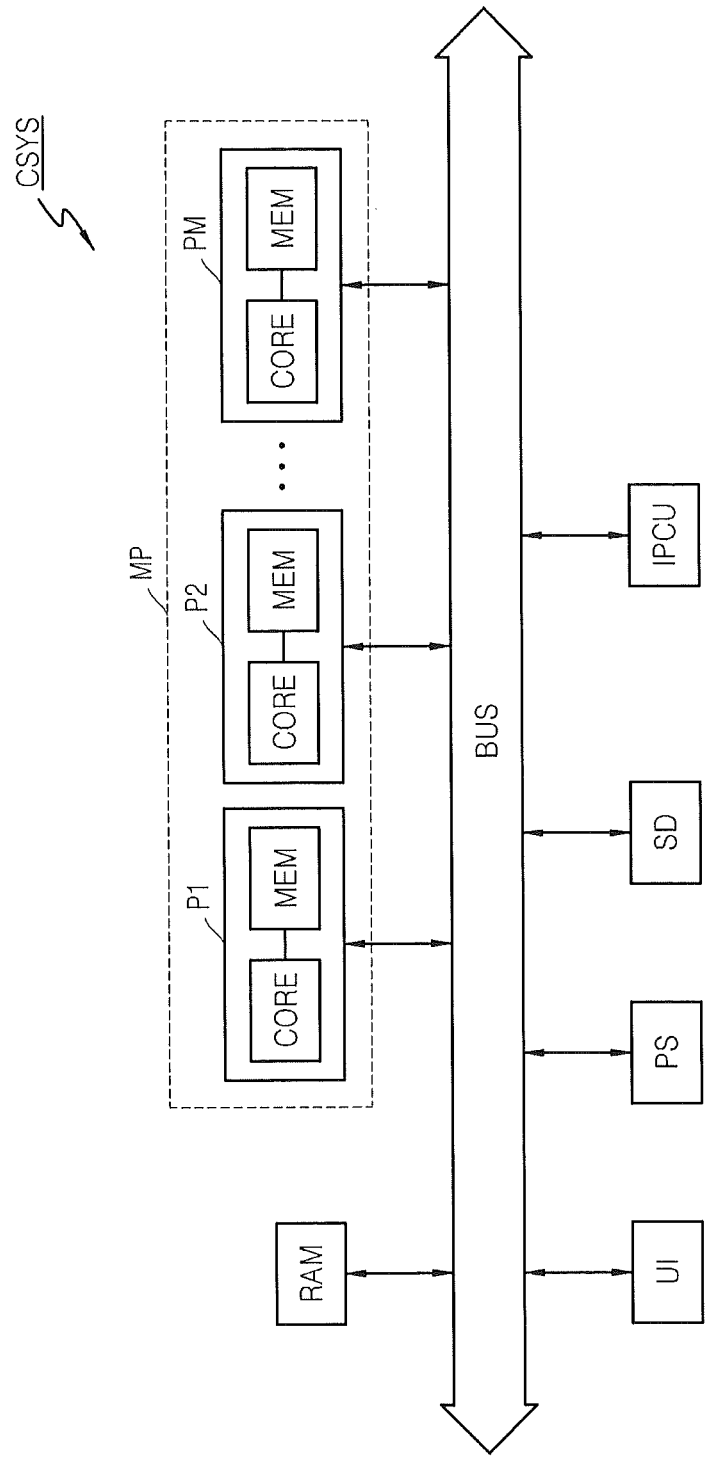
FIG. 10 is a block diagram illustrating a computing system according to some embodiments of the inventive subject matter.

FIG. 10 is a block diagram illustrating a computing system CSYS according to some embodiments of the inventive subject matter. Referring to FIG. 10, the computing system CSYS includes a multi-processor MP, an IPC unit IPCU, a storage apparatus SD, a random access memory (RAM), and a user interface UI that are electrically connected to each other through a bus BUS. For example, the storage apparatus SD may be a Solid State Drive (SSD).

The multi-processor MP includes a plurality of processors P1 to PM, each of which includes a core CORE and a memory MEM. The multi-processor MP of FIG. 10 may be, for example, the multi-processor 100 of FIG. 1, and the IPC unit IPCU of FIG. 10 may be, for example, the IPC unit 300 of FIG. 1.

The processors P1 to PM included in the multi-processor MP may exchange a message, such as a multicast message, through the IPC unit IPCU. The multi-processor MP also reads and executes instructions for the computing system CSYS. For example, the multi-processor MP may allow data to be written/read in/from the storage apparatus SD. Information necessary for an operation of the multi-processor MP may be loaded in the random access memory RAM. The user interface UI may receive a user's request to transmit the request to the multi-processor MP, or output a result of an operation of the multi-processor MP. The computing system CSYS may further include a power supply PS.

When the computing system CSYS is a mobile apparatus, a modem such as a baseband chipset and a battery for supplying an operation voltage of the computing system CSYS may be also be provided. The computing system CSYS may further include an application chipset, a Camera Image Processor (CIS), and a mobile Dynamic RAM (DRAM) and/or other components.

Figure 11:
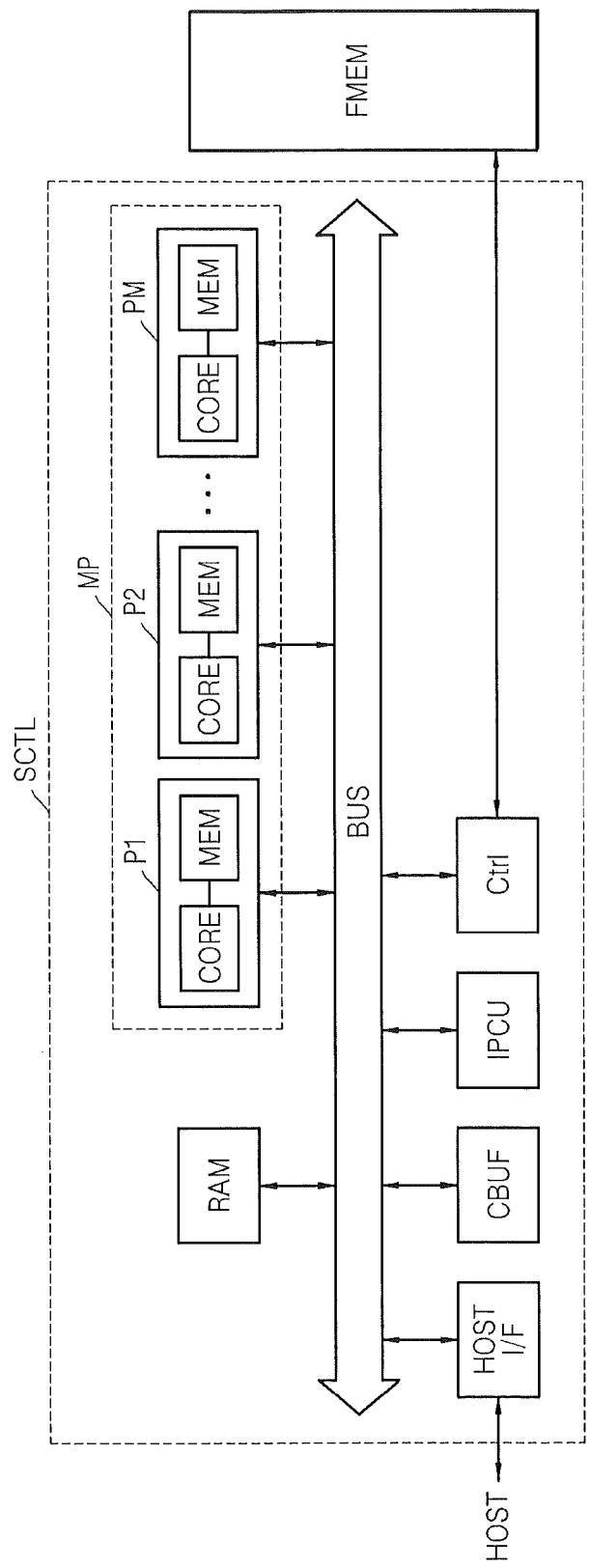
FIG. 11 is a block diagram illustrating a solid state drive (SSD) according to some embodiments of the inventive subject matter.

FIG. 11 is a block diagram illustrating an SSD according to some embodiments of the inventive subject matter. Referring to FIG. 11, the SSD may include an SSD controller SCTL and a flash memory FMEM. The SSD controller SCTL may include a multi-processor MP, an IPC unit IPCU, a random access memory (RAM), a cache buffer CBUF, a host interface HOST I/F, and a memory controller Ctrl that are electrically connected to each other through a bus BUS.

The multi-processor MP includes a plurality of processors P1 to PM, each of which includes a core CORE and a memory MEM. The multi-processor MP of FIG. 11 may be the multi-processor 100 of FIG. 1, and the IPC unit IPCU of FIG. 11 may be the IPC unit 300 of FIG. 1.

The multi-processor MP controls such that the memory controller Ctrl transmits/receives data to/from the flash memory FMEM, in response to a request (for example, an instruction, an address, and data) of a host (not shown). Information necessary for an operation of the multi-processor MP may be loaded in the random access memory RAM.

The host interface HOST I/F receives the request of the host to transmit the request to the multi-processor MP, or transmits data, transmitted from the flash memory FMEM, to the host. The host interface HOST I/F may interface the host according to various interface protocols such as Universal Serial Bus (USB), Man Machine Communication (MMC), Peripheral Component Interconnect-Express (PCI-E), Serial Advanced Technology Attachment (SATA), Parallel Advanced Technology Attachment (PATA), Small Computer System Interface (SCSI), Enhanced Small Device Interface (ESDI), and Intelligent Drive Electronics (IDE). Data that is intended to be transmitted to the flash memory FMEM or transmitted from the flash memory FMEM may be temporarily stored in the cache buffer CBUF. The cache buffer CBUF may be a Static RAM (SRAM) or the like.

Figure 12:
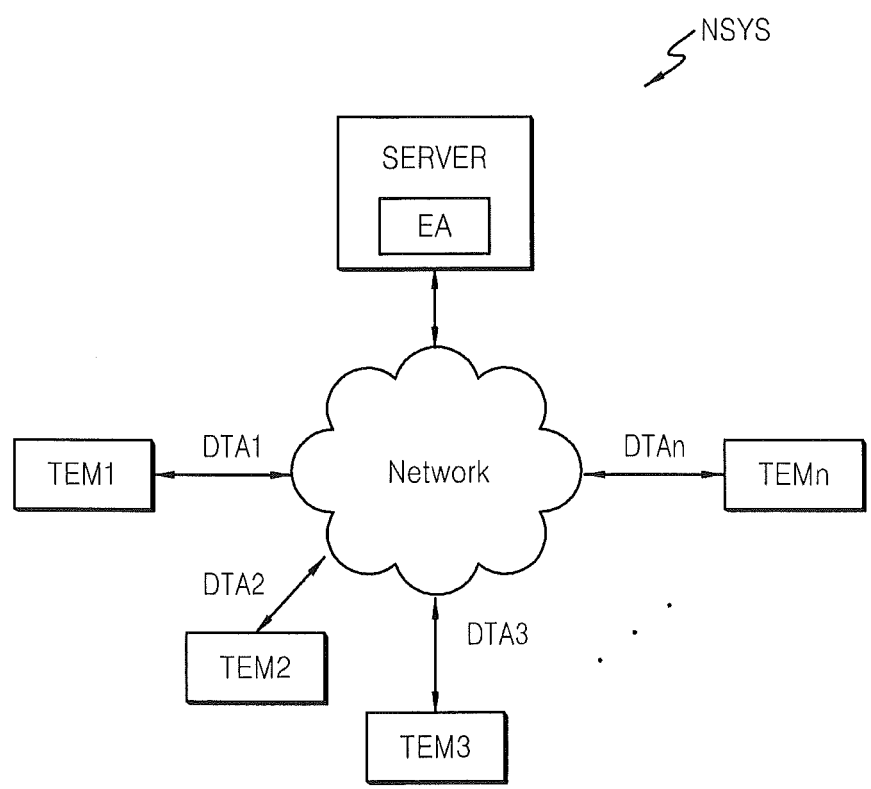
FIG. 12 is a diagram illustrating a network system apparatus according to some embodiments of the inventive subject matter.

FIG. 12 is a diagram illustrating a network system NSYS according to some embodiments of the inventive subject matter. Referring to FIG. 12, an electronic apparatus EA may be included in a server SERVER connected to the network system NSYS. The network system NSYS may include the server SERVER and a plurality of terminals TEM1 to TEMn that are connected to each other over a network. The server SERVER processes a plurality of requests that are respectively received from the terminals TEM1 to TEMn connected to the network. The electronic apparatus EA may include a multi-processor and an IPC unit along line described above. The processors may exchange a message through the IPC unit. For example, the electronic apparatus EA of FIG. 12 may be the electronic apparatus 500 of FIG. 1.

While specific terms were used, they were not used to limit the meaning or the scope of the inventive subject matter described in claims, but merely used to explain the inventive subject matter. Accordingly, a person having ordinary skill in the art will understand from the above that various modifications and other equivalent embodiments are also possible. Hence, the real protective scope of the inventive subject matter shall be determined by the technical scope of the accompanying claims.

What is claimed is:

1. An apparatus comprising:
a multiprocessor comprising a plurality of processors, each of the processors comprising a core and an associated memory having a common buffer unit, a transmitting buffer unit and a receiving buffer unit defined therein;
an inter-processor communication (IPC) unit coupled to the multiprocessor and configured to support communication between the processors,
wherein each of the cores is configured to store multicast messages to be transmitted in the common buffer unit of the associated memory and to store unicast messages to be transmitted in the transmitting buffer unit of the associated memory.

2. The apparatus of claim 1, wherein the IPC unit comprises a direct memory access (DMA) control unit comprising a DMA buffer unit and configured to read the multicast message stored in a common buffer unit of first one of the processors and to store the multicast message in the DMA buffer unit.

3. The apparatus of claim 2, wherein the DMA control unit is further configured to send the multicast message stored in the DMA buffer unit to at least second and third ones of the processors.

4. The apparatus of claim 3, wherein the DMA control unit is configured to write the multicast message in the receiving buffer units of the at least second and third ones of the processors.

5. The apparatus of claim 3, wherein the DMA control unit is configured to send the multicast message to at least one of the second and third ones of the processors and to transmit an acknowledgment signal for the at least one of the second and third ones of the processors to the first one of the processors.

6. The apparatus of claim 5, wherein the multicast message comprises a header field identifying a receiving processor set.

7. The apparatus of claim 6, wherein the header field indicates the receiving processor set using a bitmap.

8. The apparatus of claim 7, wherein the core of the first processor is configured to modify the header field of the multicast message stored in the common buffer unit of the sending processor responsive to the acknowledgment signal.

9. The apparatus of claim 2, wherein the DMA control unit is configured to read a unicast message stored in the transmitting buffer unit and to store the unicast message in the DMA buffer unit and wherein the DMA control unit is further configured to send the unicast message stored in the DMA buffer unit to a second one of the processors.

10. The apparatus of claim 9, wherein the DMA control unit is configured to send the multicast message prior to sending the unicast message.

11. An apparatus comprising:
a multiprocessor comprising at least three processors, each of the processors comprising a core and an associated memory having a common buffer unit, a transmitting buffer unit and a receiving buffer unit defined therein;
an inter-processor communication (IPC) unit coupled to the multiprocessor and configured to support communication between the processors,
wherein each of the at least three processors is configured to store multicast messages to be transmitted in the common buffer unit of the associated memory and to store unicast messages to be transmitted in the transmitting buffer unit of the associated memory.

12. The apparatus of claim 11, wherein the IPC unit is configured to read a multicast message stored in the common buffer unit of a first one of the at least three processors and to write the read multicast message in a receiving buffer unit of each of at least second and third ones of the at least three processors and wherein the IPC unit is configured to read a unicast message stored in the transmitting buffer unit of the first one of the at least three processors and to write the read unicast message in one other processor among the at least three processors.

13. The apparatus of claim 12, wherein the IPC unit is configured to process first the multicast message prior to the unicast message.

14. The apparatus of claim 12, wherein the IPC unit is configured to access the memories of the at least three processors independently from the cores of the at least three processors.

15. The apparatus of claim 11, wherein the multi-processor and the IPC unit are included in a server.

16. An apparatus comprising:
a multiprocessor comprising a plurality of processors comprising respective memories, each of the memories having a dedicated storage location for multicast messages;
at least one bus coupled in common to the plurality of processors; and
an inter-processor communication (IPC) unit coupled to the at least one bus and configured to retrieve multicast messages from the dedicated storage locations via the at least one bus and to selectively route the retrieved multicast messages among the plurality of memories.

17. The apparatus of claim 16, wherein the processors are configured to modify header fields of messages stored in the dedicated storage locations for multicast messages responsive to, acknowledgement messages received from the IPC unit.

18. The apparatus of claim 16, wherein each of the memories includes respective dedicated storage locations for unicast messages intended for respective processors of the plurality of processors.

19. The apparatus of claim 16, wherein the multiprocessor, the at least one bus and the IPC unit are configured to enable direct memory access by the IPC unit to the plurality of memories independently of cores of the processors.

20. The apparatus of claim 16, wherein the plurality of memories each comprise dedicated storage locations for messages received from the IPC unit.

* * * * *